United States Patent
Inagaki et al.

(10) Patent No.: US 10,040,413 B2
(45) Date of Patent: Aug. 7, 2018

(54) VEHICLE

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventors: Yuya Inagaki, Kariya (JP); Toshinao Wada, Miyoshi (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/416,006

(22) Filed: Jan. 26, 2017

(65) Prior Publication Data
US 2017/0210314 A1 Jul. 27, 2017

(30) Foreign Application Priority Data
Jan. 27, 2016 (JP) .................. 2016-013160

(51) Int. Cl.
- *B60K 1/04* (2006.01)
- *B60R 16/04* (2006.01)
- *B60R 7/04* (2006.01)
- *B60R 11/00* (2006.01)

(52) U.S. Cl.
CPC ............. *B60R 16/04* (2013.01); *B60K 1/04* (2013.01); *B60R 7/04* (2013.01); *B60R 11/00* (2013.01); *B60K 2001/0427* (2013.01); *B60R 2011/005* (2013.01); *B60R 2011/0007* (2013.01)

(58) Field of Classification Search
CPC .... B60K 1/04; B60K 2001/0427; B60R 7/04; B60R 2011/0007
See application file for complete search history.

(56) References Cited

U.S. PATENT DOCUMENTS

| | | | |
|---|---|---|---|
| 6,811,197 B1 * | 11/2004 | Grabowski | B60R 7/04 180/68.5 |
| 8,118,125 B2 * | 2/2012 | Suzuki | B60K 1/04 180/68.5 |
| 2007/0007060 A1 * | 1/2007 | Ono | B60K 1/04 180/65.31 |
| 2007/0284167 A1 * | 12/2007 | Watanabe | B60L 3/0046 180/68.5 |

(Continued)

FOREIGN PATENT DOCUMENTS

| | | |
|---|---|---|
| JP | 2007-269229 A | 10/2007 |
| JP | 2013-71729 A | 4/2013 |
| JP | 2014-104940 A | 6/2014 |

*Primary Examiner* — Katy M Ebner
(74) *Attorney, Agent, or Firm* — Sughrue Mion, PLLC

(57) ABSTRACT

A vehicle includes: a body forming a floor portion in a vehicle compartment; a console box provided on the body and placed in the vehicle compartment; a battery provided below the console box; a battery case configured to accommodate the battery; and a fastening member and a fastening member configured to fasten the console box to the body side and the battery case side, respectively. With such a configuration, there is provided a vehicle capable of supporting a console box in a vehicle compartment without causing an increase in weight and a higher cost.

6 Claims, 2 Drawing Sheets

(56) References Cited

U.S. PATENT DOCUMENTS

| | | | |
|---|---|---|---|
| 2008/0164081 A1* | 7/2008 | Watanabe | B60H 1/00278 180/68.5 |
| 2009/0315359 A1* | 12/2009 | Suzuki | B60K 1/04 296/64 |
| 2010/0001553 A1* | 1/2010 | Yoda | B60K 1/04 296/193.07 |
| 2010/0071980 A1* | 3/2010 | Kokaji | B60H 1/00278 180/68.5 |
| 2010/0089675 A1* | 4/2010 | Nagata | B60K 1/04 180/68.5 |
| 2010/0213741 A1* | 8/2010 | Suzuki | B60K 1/04 296/193.07 |
| 2011/0132676 A1* | 6/2011 | Kodaira | B60K 1/04 180/65.51 |
| 2012/0118653 A1* | 5/2012 | Ogihara | B60K 1/04 180/65.8 |
| 2013/0045398 A1* | 2/2013 | Katano | B60K 1/04 429/7 |
| 2013/0078496 A1* | 3/2013 | Lim | B60K 1/04 429/120 |
| 2013/0140101 A1* | 6/2013 | Lim | B60K 1/04 180/68.5 |
| 2014/0124277 A1* | 5/2014 | Kurakawa | H01M 2/1083 180/65.1 |
| 2016/0176445 A1* | 6/2016 | Ito | B60K 1/04 296/193.07 |
| 2017/0190295 A1* | 7/2017 | Ogawa | B60K 1/04 |

* cited by examiner

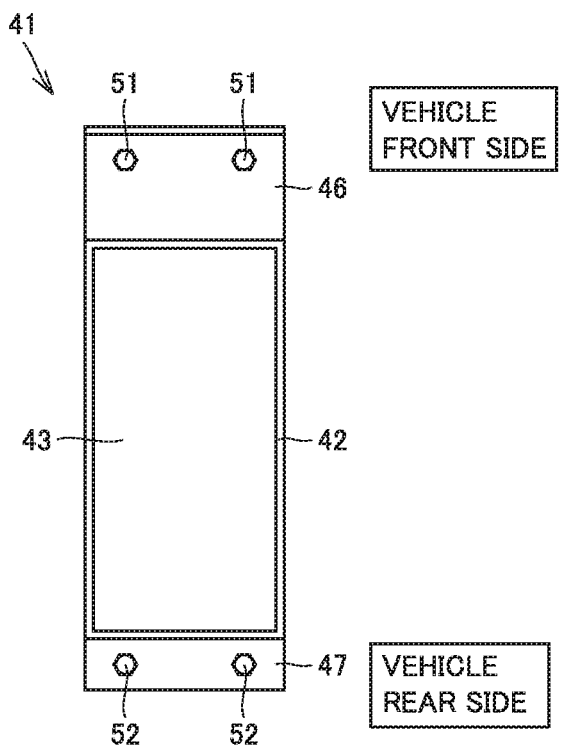
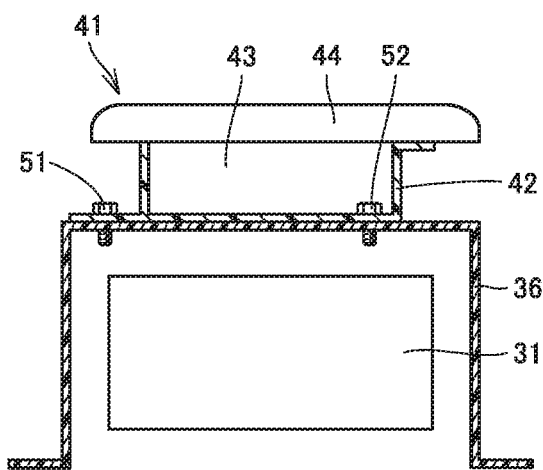

VEHICLE

This nonprovisional application is based on Japanese Patent Application No. 2016-013160 filed on Jan. 27, 2016 with the Japan Patent Office, the entire contents of which are hereby incorporated by reference.

BACKGROUND OF THE INVENTION

Field of the Invention

The present invention generally relates to a vehicle, and more particularly to a vehicle including a console box.

Description of the Background Art

Regarding a conventional vehicle including a console box, Japanese Patent Laying-Open No. 2013-71729, for example, discloses a high-voltage battery pack device for a vehicle intended to utilize a luggage room of the vehicle more efficiently and thus improve the marketability of the vehicle. In the high-voltage battery pack device disclosed in Japanese Patent Laying-Open No. 2013-71729, a high-voltage battery pack is placed in a center console in a vehicle compartment.

In addition, Japanese Patent Laying-Open No. 2007-269229 discloses a console box intended to suppress an increase in size and accommodate a desired article to be accommodated with a simple structure. The console box disclosed in Japanese Patent Laying-Open No. 2007-269229 has a main body provided with a plurality of accommodating portions. The main body has a long shape in a vehicle body front-rear direction, and is fixed to a floor panel of a vehicle.

In addition, Japanese Patent Laying-Open No. 2014-104940 discloses a console structure intended to absorb the impact when the impact load is applied to the console from above a vehicle. In the console structure disclosed in Japanese Patent Laying-Open No. 2014-104940, a console box has a container portion capable of accommodating small articles and the like. The container portion is supported on a floor of a vehicle body via a bracket.

SUMMARY OF THE INVENTION

As disclosed in Japanese Patent Laying-Open No. 2013-71729 mentioned above, a vehicle structure including a battery provided below a console box has been known. When the console box is fastened to a battery case in such vehicle structure, increasing the rigidity of the battery case as a whole is required in order to firmly support the console box in the vehicle compartment. This raises concerns about an increase in weight and a higher cost caused when the console box is supported.

Accordingly, an object of the present invention is to solve the above-described problem and provide a vehicle capable of supporting a console box in a vehicle compartment without causing an increase in weight and a higher cost.

A vehicle according to the present invention includes: a body forming a floor portion in a vehicle compartment; a console box provided on the body and placed in the vehicle compartment; a battery provided below the console box; a battery case configured to accommodate the battery; and a first fastening member and a second fastening member configured to fasten the console box to the body side and the battery case side, respectively.

According to the present invention, there can be provided a vehicle capable of supporting a console box in a vehicle compartment without causing an increase in weight and a higher cost.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a plan view showing a console box in FIG. 1.

FIG. 3 is a cross-sectional view showing a support structure of a console box according to a comparative example.

DESCRIPTION OF THE PREFERRED EMBODIMENTS

Figure 1:
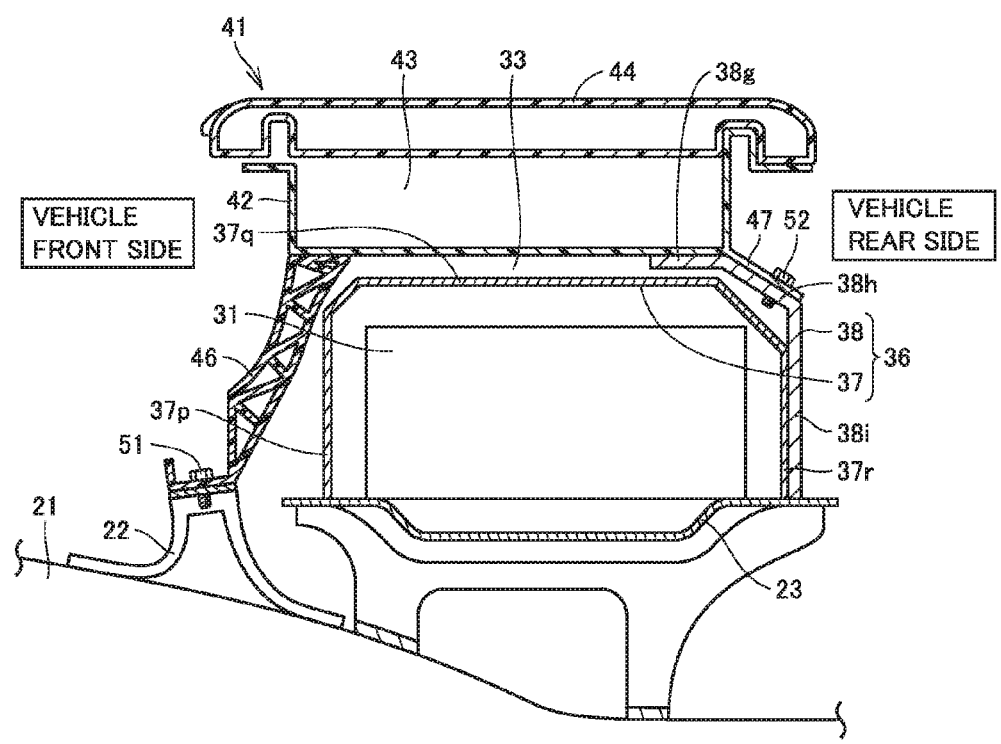
FIG. 1 is a cross-sectional view showing the interior of a vehicle compartment of a vehicle according to an embodiment of the present invention.

An embodiment of the present invention will be described with reference to the drawings. In the drawings referenced below, the same or corresponding members are denoted by the same reference numerals.

FIG. 1 is a cross-sectional view showing the interior of a vehicle compartment of a vehicle according to an embodiment of the present invention. Referring to FIG. 1, the vehicle according to the present embodiment is, for example, a hybrid vehicle or an electric vehicle powered by an internal combustion engine such as a gasoline engine or a diesel engine and a motor driven by supply of the electric power from a battery.

The vehicle according to the present embodiment has a body 21, a console box 41, a battery 31, a battery case 36, and a fastening member 51 and a fastening member 52.

The body 21 is a part of a vehicle main body and forms a floor portion in a vehicle compartment. The body 21 is a floor panel. A console box support portion 22 and a battery support portion 23 are fixed to the body 21. The console box support portion 22 and the battery support portion 23 are provided in line in a vehicle front-rear direction. The console box support portion 22 is provided on the vehicle front side, and the battery support portion 23 is provided on the vehicle rear side.

FIG. 2 is a plan view showing the console box in FIG. 1. Referring to FIGS. 1 and 2, the console box 41 is a box for accommodating small articles and the like placed in the vehicle compartment.

The console box 41 is provided on the body 21. The console box 41 is provided between a driver's seat and a passenger's seat aligned in a vehicle width direction. The console box 41 as a whole is made of a resin molded article.

The console box 41 has an accommodating portion 42 and a lid portion 44. The accommodating portion 42 has a housing shape that is open upwardly, and forms an accommodating space 43 for articles. The accommodating portion 42 has a substantially rectangular shape in a planar view. A long side direction of the accommodating portion 42 in the planar view corresponds to the vehicle front-rear direction and a short side direction of the accommodating portion 42 in the planar view corresponds to the vehicle width direction. The lid portion 44 is provided to be capable of opening and closing the opening of the accommodating portion 42.

The battery 31 is supported by the battery support portion 23. The battery 31 is disposed on the battery support portion 23. The battery 31 is provided below the console box 41 (the accommodating portion 42). The battery 31 is arranged between the battery support portion 23 and the accommodating portion 42 of the console box 41 in a vertical direction.

The battery 31 as a whole has a substantially rectangular parallelepiped shape. The battery 31 is arranged such that a long side direction thereof in a planar view corresponds to the vehicle front-rear direction and a short side direction thereof in the planar view corresponds to the vehicle width direction.

The type of the battery 31 is not particularly limited. The battery 31 may be, for example, a battery charged during regenerative braking of the vehicle, or a battery charged by an external power supply, or a battery charged by a photovoltaic power generation system mounted on the vehicle.

The battery 31 is accommodated in the battery case 36. The battery case 36 as a whole is made of sheet metal.

The battery case 36 has a main body portion 37 and a plate-like portion 38. The main body portion 37 forms a main portion of the battery case 36 serving as a case body that accommodates the battery 31. The main body portion 37 has a housing shape and is provided to cover the battery 31.

The main body portion 37 has a front portion 37p, a top portion 37q and a rear portion 37r as the components of the main body portion 37. The front portion 37p is arranged on the vehicle front side with respect to the battery 31, and the rear portion 37r is arranged on the vehicle rear side with respect to the battery 31. The top portion 37q is arranged above the battery 31 and extends between the front portion 37p and the rear portion 37r along the vehicle front-rear direction.

The plate-like portion 38 has a plate shape bent at a plurality of locations and is fixed to the main body portion 37. In the present embodiment, the plate-like portion 38 is fixed to the main body portion 37 by spot welding. The plate-like portion 38 is fixed to the rear portion 37r of the main body portion 37.

The plate-like portion 38 has a higher rigidity than that of the main body portion 37. More specifically, a thickness of the sheet metal forming the plate-like portion 38 is greater than a thickness of the sheet metal forming the main body portion 37. As one example, the thickness of the sheet metal forming the main body portion 37 is 0.7 mm and the thickness of the sheet metal forming the plate-like portion 38 is 1.4 mm.

Means for configuring the plate-like portion 38 to have a high rigidity is not limited to the aforementioned thickness of the sheet metal. The plate-like portion 38 may have a high rigidity due to a difference in material of the sheet metal, or the plate-like portion 38 may have a high rigidity by providing a rib structure.

The plate-like portion 38 has a top portion 38g, a corner portion 38h and a rear portion 38i as the components of the plate-like portion 38. The top portion 38g is arranged to face the top portion 37q of the main body portion 37. The rear portion 38i is fixed to the rear portion 37r of the main body portion 37. The corner portion 38h is arranged on the corner of the top portion 38g and the rear portion 38i. The corner portion 38h extends between the top portion 38g and the rear portion 38i in an oblique direction. The top portion 38g and the corner portion 38h are arranged to form a gap between the top and corner portions 38g and 38h and the main body portion 37.

The fastening member 51 fastens the console box 41 to the body 21 side. More specifically, the fastening member 51 fastens the console box 41 to the console box support portion 22 on the body 21 side. The fastening member 52 fastens the console box 41 to the battery case 36 side. More specifically, the fastening member 52 fastens the console box 41 to the plate-like portion 38 (corner portion 38h) of the battery case 36.

The console box 41 further has an extending portion 46 and an extending portion 47. The extending portion 46 and the extending portion 47 are provided to extend from the accommodating portion 42 toward the outside of the accommodating space 43. The extending portion 46 and the extending portion 47 are provided to be spaced apart from each other in the vehicle front-rear direction. The extending portion 46 is provided on the vehicle front side, and the extending portion 47 is provided on the vehicle rear side. The extending portion 46 and the extending portion 47 are provided at opposing ends in the long side direction of the accommodating portion 42 (vehicle front-rear direction).

More specifically, the extending portion 46 is provided at the front end of the accommodating portion 42. The extending portion 46 extends from the accommodating portion 42 through the vehicle front side of the battery case 36 (the front portion 37p of the main body portion 37) to the console box support portion 22. The extending portion 46 extends from the accommodating portion 42 obliquely downward and forward. Together with the plate-like portion 38 of the battery case 36, the extending portion 46 is provided to span the battery 31 from the vehicle front-rear side. The extending portion 46 has a rib having a truss-shaped cross section and is configured to have a high rigidity. The fastening member 51 fastens the extending portion 46 to the console box support portion 22.

The extending portion 47 is provided at the rear end of the accommodating portion 42. The extending portion 47 extends from the accommodating portion 42 toward the vehicle rear. The extending portion 47 extends from the accommodating portion 42 obliquely downward and rearward. The extending portion 47 is in surface contact with the corner portion 38h of the plate-like portion 38. The fastening member 52 fastens the extending portion 47 to the corner portion 38h of the plate-like portion 38.

The extending portion 46 fastened to the body 21 side needs to extend from the accommodating portion 42 through the position adjacent to the battery case 36 to the body 21. On the other hand, the extending portion 47 fastened to the battery case 36 side has a short length of extension from the accommodating portion 42 because the battery case 36 is provided directly below the accommodating portion 42. On the vehicle rear side with respect to the battery case 36, there is legroom for passengers seated on a rear seat and there is not relatively enough space. Therefore, in the present embodiment, the extending portion 46 fastened to the body 21 side is provided on the vehicle front side, and the extending portion 47 fastened to the battery case 36 side is provided on the vehicle rear side.

In addition, in the present embodiment, the fastened sections of the console box 41 are spaced apart from each other in the long side direction of the accommodating portion 42, and thus, the console box 41 can be supported more firmly in the vehicle compartment. Furthermore, a gap 33 is provided between the accommodating portion 42 of the console box 41 and the battery case 36 (the top portion 37q of the main body portion 37). Such a configuration makes it possible to prevent the weight of the console box 41 from directly acting on the low-rigidity accommodating portion 42.

Although not shown in FIG. 1, a decorative cover forming an outer appearance of the console box 41 is provided on the body 21 to cover the structure located below the lid portion 44. In addition, although the bolts are shown as the fastening member 51 and the fastening member 52 in FIG. 1, the present invention is not limited thereto. A clip member, a fitting structure and the like may, for example, be used.

FIG. 3 is a cross-sectional view showing a support structure of a console box according to a comparative example. Referring to FIG. 3, in this comparative example, the console box 41 is fastened to the battery case 36 by the fastening member 51 and the fastening member 52. The fastening member 52 fastens the console box 41 to the battery case 36 inside the accommodating portion 42.

In this case, it is necessary to increase the rigidity (the thickness of the sheet metal) of the battery case 36 as a whole in order to firmly support the console box 41 in the vehicle compartment. In addition, the fastening member 52 is arranged inside the accommodating portion 42, and thus, it is concerned that the work for fastening the console box 41 by the fastening member 52 becomes complicated.

In contrast, referring to FIGS. 1 and 2, in the present embodiment, the console box 41 is fastened to the body 21 side and the battery case 36 side, and thus, the portion of the battery case 36 that requires an increase in rigidity can be limited to the plate-like portion 38. This can prevent an increase in weight and a higher cost caused when the battery case 36 is supported in the vehicle compartment.

In addition, in the present embodiment, the console box 41 is fastened to the body 21 side and the battery case 36 side in the extending portions 46 and 47 extending from the accommodating portion 42 toward the outside of the accommodating space 43. Such a configuration can facilitate the work for fastening the console box 41 to the body 21 side and the battery case 36 side.

The structure of the vehicle according to the embodiment of the present invention described above will be summarized. The vehicle according to the present embodiment includes: the body 21 forming the floor portion in the vehicle compartment; the console box 41 provided on the body 21 and placed in the vehicle compartment; the battery 31 provided below the console box 41; the battery case 36 configured to accommodate the battery 31; and the fastening member 51 as a first fastening member and the fastening member 52 as a second fastening member configured to fasten the console box 41 to the body 21 side and the battery case 36 side, respectively.

According to the vehicle of the embodiment of the present invention configured as described above, the console box 41 can be supported in the vehicle compartment without causing an increase in weight and a higher cost.

A vehicle according to the present invention includes: a body forming a floor portion in a vehicle compartment; a console box provided on the body and placed in the vehicle compartment; a battery provided below the console box; a battery case configured to accommodate the battery; and a first fastening member and a second fastening member configured to fasten the console box to the body side and the battery case side, respectively.

According to the vehicle configured as described above, the console box is fastened to the body side and the battery case side, and thus, it becomes unnecessary to increase the rigidity of the battery case as a whole. As a result, the console box can be supported in the vehicle compartment without causing an increase in weight and a higher cost.

Preferably, a fastened section of the battery case to which the console box is fastened has a rigidity higher than that of the other section of the battery case.

According to the vehicle configured as described above, the console box can be supported more firmly in the vehicle compartment.

Preferably, the battery case has a main body portion having a housing shape and provided to cover the battery, and a plate-like portion fixed to the main body portion. The fastened section of the battery case to which the console box is fastened is the plate-like portion.

According to the vehicle configured as described above, the rigidity of the fastened section of the battery case to which the console box is fastened can be easily increased.

Preferably, a gap is provided between the main body portion and the console box.

According to the vehicle configured as described above, it is possible to prevent the weight of the console box from directly acting on the low-rigidity main body portion.

Preferably, the console box has an accommodating portion forming an accommodating space for articles, and a first extending portion and a second extending portion extending from the accommodating portion toward the outside of the accommodating space. The first extending portion and the second extending portion are fastened to the body side and the battery case side, respectively.

According to the vehicle configured as described above, the first extending portion and the second extending portion are located outside the accommodating space, and thus, the console box can be easily fastened to the body side and the battery case side.

Preferably, the accommodating portion has a substantially rectangular shape in a planar view, in which a long side direction of the accommodating portion corresponds to a vehicle front-rear direction and a short side direction of the accommodating portion corresponds to a vehicle width direction. The first extending portion and the second extending portion are provided at opposing ends of the accommodating portion in the long side direction.

According to the vehicle configured as described above, the first extending portion and the second extending portion fastened to the body side and the battery case side, respectively, are spaced apart from each other in the long side direction of the accommodating portion, and thus, the console box can be supported more firmly.

Preferably, the console box is provided between a driver's seat and a passenger's seat. The first extending portion and the second extending portion are provided on the vehicle front side and on the vehicle rear side, respectively.

According to the vehicle configured as described above, the console box is fastened to the body side on the vehicle front side where there is relatively enough space, and the console box is fastened to the battery case side on the vehicle rear side where there is not relatively enough space. As a result, the space in the vehicle compartment can be effectively utilized and the console box can be supported.

The present invention is applied to the vehicle including the console box.

Although the embodiment of the present invention has been described, it should be understood that the embodiment disclosed herein is illustrative and non-restrictive in every respect. The scope of the present invention is defined by the terms of the claims, and is intended to include any modifications within the meaning and scope equivalent to the terms of the claims.

What is claimed is:
1. A vehicle comprising:
 a body forming a floor portion in a vehicle compartment;
 a console box provided on the body and placed in the vehicle compartment, the console box having an accommodating portion forming an accommodating space for articles;
 a battery provided below the console box;

a battery case configured to accommodate the battery; and a first fastening member and a second fastening member configured to fasten the console box to the body and the battery case, respectively, outside the accommodating space, wherein the console box has a first extending portion and a second extending portion extending from the accommodating portion toward the outside of the accommodating space, the first fastening member fastens the first extending portion to the body, and the second fastening member fastens the second extending portion to the battery case.

2. The vehicle according to claim 1, wherein a fastened section of the battery case to which the console box is fastened has a rigidity higher than that of the other section of the battery case.

3. The vehicle according to claim 2, wherein the battery case has a main body portion configured to cover the battery, and a plate portion fixed to the main body portion, and the fastened section of the battery case to which the console box is fastened is the plate portion.

4. The vehicle according to claim 3, wherein a gap is provided between the main body portion and the console box.

5. The vehicle according to claim 1, wherein the accommodating portion has a substantially rectangular shape in a planar view, in which a long side direction of the accommodating portion corresponds to a vehicle front-rear direction and a short side direction of the accommodating portion corresponds to a vehicle width direction, and the first extending portion and the second extending portion are provided at opposing ends of the accommodating portion in the long side direction.

6. The vehicle according to claim 5, wherein the console box is provided between a driver's seat and a passenger's seat, and the first extending portion and the second extending portion are provided on the vehicle front side and on the vehicle rear side, respectively.

\* \* \* \* \*